United States Patent [19]

Maruyama et al.

[11] Patent Number: 5,155,675
[45] Date of Patent: Oct. 13, 1992

[54] METHOD OF CONTROLLING AN INVERTER

[75] Inventors: Takafumi Maruyama; Masayoshi Kumano, both of Amagasaki, Japan

[73] Assignee: Mitsubishi Denki Kabushiki Kaisha, Japan

[21] Appl. No.: 605,486

[22] Filed: Oct. 30, 1990

[30] Foreign Application Priority Data

Nov. 22, 1989 [JP] Japan .................. 1-301934

[51] Int. Cl.⁵ .......................................... H02M 7/5387
[52] U.S. Cl. ...................................... 363/98; 363/41; 363/43; 363/132; 318/811
[58] Field of Search ................... 363/41, 43, 98, 132, 363/135; 318/811

[56] References Cited

U.S. PATENT DOCUMENTS 4,203,151  5/1980  Baker .................................... 363/43
4,270,163  5/1981  Baker .................................... 363/43

FOREIGN PATENT DOCUMENTS 0336019 10/1989 European Pat. Off. .

Primary Examiner—Emanuel T. Voeltz
Attorney, Agent, or Firm—Leydig, Voit & Mayer

[57] ABSTRACT

In a method of controlling the output voltage of a three-phase three-level inverter having a plurality of switching elements by pulse width modulation in each of three-pulse and one-pulse modes, the upper limit of the percentage modulation is set to a value equal to or smaller than the maximum percentage modulation determined by the minimum switching element off time to output a three-level voltage as an inverter output voltage in each phase if each of the switching element is turned of and off one time during one inverter output period.

2 Claims, 12 Drawing Sheets

FIG. 5

| SWITCHING ELEMENT 4A | SWITCHING ELEMENT 4B | SWITCHING ELEMENT 5A | SWITCHING ELEMENT 5B | PHASE-U OUTPUT VOLTAGE .VU |
|---|---|---|---|---|
| ON | ON | OFF | OFF | $Ed/2$ |
| OFF | ON | ON | OFF | 0 |
| OFF | OFF | ON | ON | $-Ed/2$ |

FIG. 9

| SWITCHING ELEMENT 4A | SWITCHING ELEMENT 4B | SWITCHING ELEMENT 5A | SWITCHING ELEMENT 5B | PHASE-U OUTPUT VOLTAGE Vu |
|---|---|---|---|---|
| ON | ON | OFF | OFF | $E_d/2$ |
| ON | OFF | ON | OFF | 0 |
| OFF | ON | OFF | ON | 0 |
| OFF | OFF | ON | ON | $-E_d/2$ |

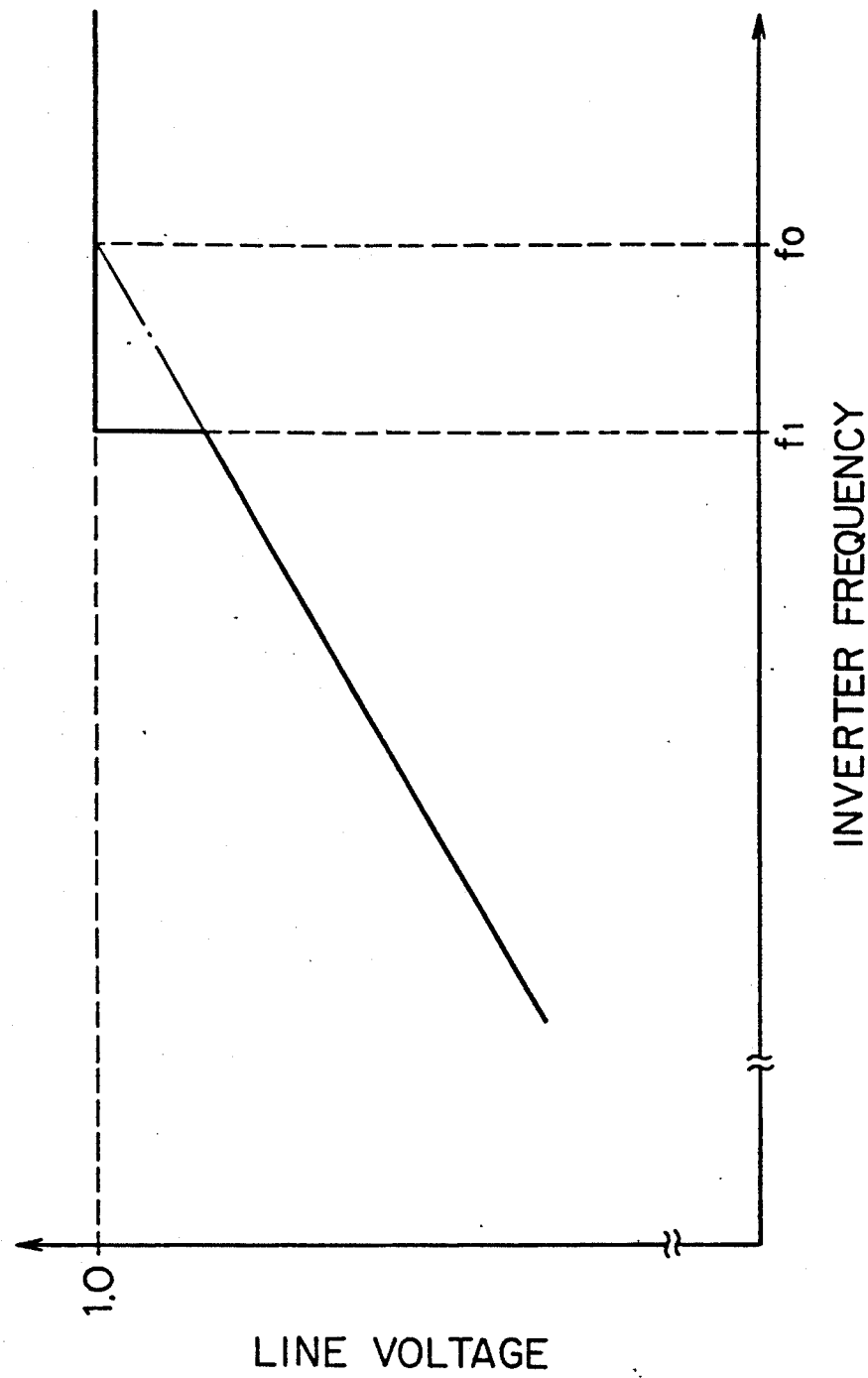

METHOD OF CONTROLLING AN INVERTER

BACKGROUND OF THE INVENTION

1. Field of the Invention

This invention relates to a three-phase three-level inverter for use in an electric railcar or the like.

2. Description of the Related Art

Conventionally, a type of three-phase two-level inverter such as that shown in FIG. 10 has been used for inverter electric railcars. This inverter operates in a constant-V/f control mode called a three-pulse mode in the range of inverter frequencies lower than a predetermined frequency. This mode is based on a synchronous pulse width modulation method in which sinusoidal waves and a triangular wave are compared and, in this mode, the frequency of the triangular wave is three times as those of the sinusoidal waves. In the range of frequencies higher than the predetermined frequency, the inverter operates in a whole voltage control mode called a one-pulse mode.

Referring to FIG. 10, the inverter has a DC power source 1, a reactor 2 connected to a plus terminal of the DC power source 1, and a capacitor 3 connected between the reactor 2 and a minus terminal of the DC power source 1. Three pairs of switching elements 4-5, 6-7, and 8-9 each connected in series are connected in parallel with the capacitor 3. Free-wheeling diodes 10 to 15 are connected in parallel with the respective switching elements 4 to 9 with reverse polarities. A phase-U output terminal 16, a phase-V output terminal 17 and a phase-W output terminal 18 extend from middle points between the pairs of switching elements.

The reactor 2 and the capacitor 3 form a DC filter, and each of the switching elements 4 to 9 is a GTO thyristor, a power transistor or the like.

The operation of this inverter will be described below with reference to FIGS. 11 and 12. Referring to FIG. 11, in the three-pulse mode, a phase-U output voltage $V_u$ is obtained from a phase-U sinusoidal modulating wave $S_u$ and a triangular carrier wave $S_c$, and a phase-V output voltage $V_v$ is obtained from a phase-V sinusoidal modulating wave $S_v$ and the triangular carrier wave $S_c$. The line U-V voltage $V_v$ is obtained by $$V_{uv} = V_u - V_v$$

In the one-pulse mode, the line U-V voltage $V_{uv1}$ is exhibited as a rectangular wave having a width of 120°.

In ordinary operation of conventional inverter electric railcars, the operation is changed over from the three-pulse mode to the one-pulse mode as the inverter frequency is increased; the inverter operates in the one-pulse mode in the range of high inverter frequencies. However, at the time of transition from the three-pulse mode to the one-pulse mode, a voltage jump of about 10 % of the whole voltage takes place as shown in FIG. 12. This phenomenon is described, for example, on page 26 of Hitachi Hyouron (Hitachi Review), Vol. 68, No. 8 (1986-8).

In the three-pulse mode, the ratio of the amplitude of each phase sinusoidal modulating wave to the amplitude of the triangular carrier wave $S_c$, i.e., the percentage modulation is changed to control the angle $\theta$ which is determined by the points of intersection of each phase sinusoidal modulating wave and the triangular carrier wave $S_c$ as shown in FIG. 11, thereby changing the line U-V voltage $V_{uv}$. However, the angle $\theta$ has a minimum value $\theta_{min} > 0$ depending upon restrictions owing to the minimum switching element off time, setting of a period of time for preventing short-circuit of upper and lower arms of the inverter unit, and so on.

In contrast, the line voltage $V_{UV1}$ in the one-pulse mode forms a 120° width rectangular wave, as mentioned above. At the time of transition from the three-pulse mode to the one-pulse mode, therefore, the line voltage is abruptly increased by a step corresponding to the width $\theta$ slit. That is, referring to FIG. 12, when the inverter operates for change-over from the three-pulse mode to the one-pulse mode at the inverter frequency $f_0$, change-over is actually effected at an inverter frequency $f_1$. In FIG. 12, the dot-dash line indicates the change in the line voltage in an ideal state.

In the conventional inverter, as described above, a discontinuous change in the line voltage of about 10 % occurs at the time of transition from three-pulse mode operation to one-phase mode operation, resulting in occurrence of an undesirable phenomenon such as an abrupt change in the inverter output current or output torque or voltage oscillation of the DC filter.

SUMMARY OF THE INVENTION

In view of these problems, it is an object of the present invention to provide an inverter control method capable of smoothly controlling the line voltage of an inverter without reducing the voltage utilization coefficient.

An inverter control method in accordance with the present invention is a method of controlling the output voltage of a three-phase three-level inverter having a plurality of switching elements by pulse width modulation. This method comprises setting the upper limit of the percentage modulation to a value equal to or smaller than the maximum percentage modulation determined by the minimum off time of the switching elements, and outputting a threelevel voltage as an inverter output voltage in each phase if each of the switching element is turned on and off one time during one inverter output period.

According to the present invention, the three-phase three-level inverter effects pulse width modulation even in the one-pulse mode to prevent the line voltage from changing discontinuously at the time of transition from the threepulse mode to the one-pulse mode, which phenomenon cannot be avoided by the conventional method, thereby continuously changing the line voltage. If the percentage modulation is increased to the maximum value determined by the minimum switching element off time, the voltage utilization coefficient is substantially the same as that attained by the conventional method in the one-pulse mode.

BRIEF DESCRIPTION OF THE DRAWINGS

FIG. 5 is a table of the states of switching elements of the first embodiment;

FIG. 9 is a table of the states of switching elements of the second embodiment;

FIG. 12 is a diagram of the relationship between inverter frequencies and a line voltage in the conventional method.

DESCRIPTION OF THE PREFERRED EMBODIMENTS

Embodiments of the present invention will be described below with reference to the accompanying drawings.

Figure 1:
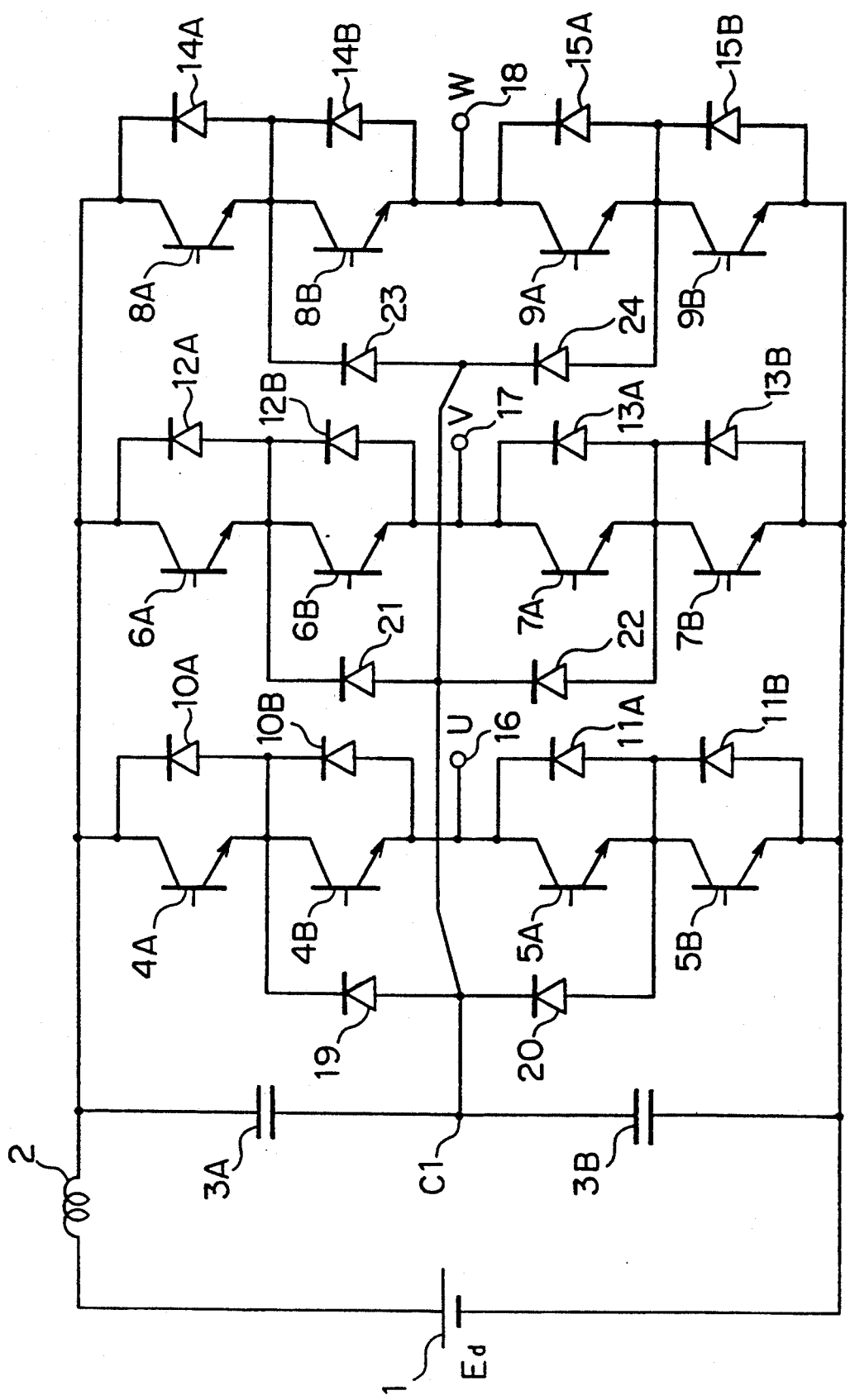
FIG. 1 is a circuit diagram of an inverter used in a first embodiment of the present invention.

An inverter shown in FIG. 1 is a three-phase three-level inverter having a DC power source 1, a reactor 2 connected to a plus terminal of the DC power source 1, and a pair of capacitors 3A and 3B connected in series between the reactor 2 and a minus terminal of the DC power source 1. The inverter also has first to sixth pairs of switching elements 4A-4B, 5A-5B, 6A-6B, 7A-7B, 8A-8B, and 9A-9B each connected in series. The first pair of switching elements 4A-4B and the second pair of switching elements 5A-5B are connected in series, the third pair of switching elements 6A-6B and the fourth pair of switching elements 7A-7B are also connected in series, and the fifth pair of switching elements 8A-8B and the ninth pair of switching elements 9A-9B also connected in series. These series circuit elements are connected in parallel between the reactor 2 and the minus terminal of the DC power source 1. Free-wheeling diodes 10A to 15B are connected in parallel with the respective switching elements 4A to 9B with reverse polarities.

The cathodes of first, third and fifth diodes 19, 21 and 23 are respectively connected to middle points between the switching elements forming the first, third and fifth pairs, and the anodes of these diodes are connected to a connection point Cl between the capacitors 3A and 3B. The anodes of second, fourth and sixth diodes 20, 22 and 24 are respectively connected to middle points between the switching elements forming the second, fourth and sixth pairs, and the cathodes of these diodes are connected to the connection point Cl between the capacitors 3A and 3B. A phase-U output terminal 16 extends from a connection point between the first and second pairs of switching elements, a phase-V output terminal 17 extends from a connection point between the third and fourth pairs of switching elements, and a phase-W output terminal 18 extends from a connection point between the fifth and sixth pairs of switching elements.

Each of the switching elements 4A to 9B is a GTO thyristor, a power transistor or the like.

Figure 2:
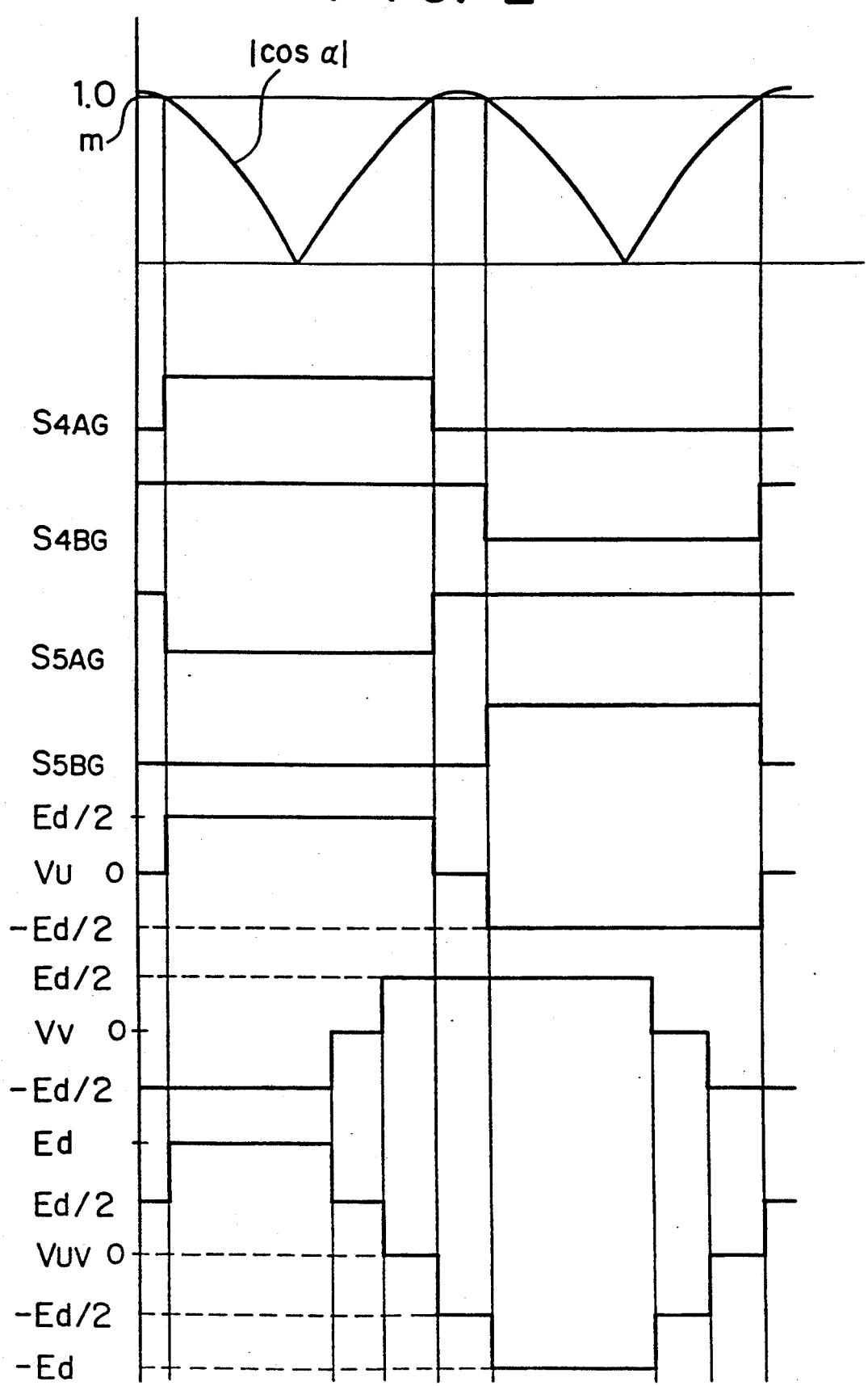
FIGS. 2 and 3 are diagrams of waveforms of the first embodiment.

A method of controlling the inverter shown in FIG. 1 will be described below with reference to FIGS. 2 to 5. FIG. 2 is a diagram of a pulse mode corresponding to the one-pulse mode in the conventional method. In FIG. 2, m designates a percentage modulation, $S_{4AG}$ to $S_{5BG}$ designate gate signals applied to the gates of the switching elements 4A to 5B, $E_d$ designates the voltage of the DC power source 1, $V_u$ designates a phase-U output voltage with respect to the power source neutral point, $V_v$ designates a phase-V output voltage with respect to the power source neutral point, and $V_{UV}$ designates a line voltage between the phase U and the phase V.

First, the gate signals $S_{4AG}$ to $S_{5BG}$ are formed from a reference wave cos according to the percentage modulation m. Each of the gate signals $S_{4AG}$ to $S_{5BG}$ becomes high level and then low level one time during one inverter output period. Each switching element is turned on by the high level gate signal and is turned off by the low level gate signal. The percentage modulation is set to a value not greater than a maximum value $m_{max}$ determined by the minimum off time of the switching elements 4A to 9B.

The phase-U output voltage $V_u$ of the three-phase three-level inverter shown in FIG. 1 has three levels $E_d/2$, 0, and $-E_d/2$ according to the on/off states of the switching elements 4A to 5B of the first and second switching element pairs, as shown in FIG. 5. Similarly, each of the phase-V output voltage $V_v$ and a phase-W output voltage $V_w$ has three levels.

Accordingly, the phase-U output voltage $V_u$ shown in FIG. 2 can be obtained through the output terminal 16 by applying the gate signals $S_{4AG}$ to $S_{5BG}$ shown in FIG. 2 to the switching elements 4A to 5B, respectively. Similarly, phase-V and phase-W gate signals (not shown) $S_{6AG}$ to $S_{9BG}$ are formed to obtain the phase-V output voltage $V_v$ and the phaseW output voltage $V_w$ through the output terminals 17 and 18. The difference between the phase-U output voltage $V_u$ and the phase-V output voltage Vv is taken as the line U-V voltage $V_{uv}$.

Since, as shown in FIG. 2, the pulse width of the gate signals $S_{4AG}$ to $S_{5BG}$ is changed according to the percentage modulation m, the line voltage obtained in the one-pulse mode can be changed by changing the percentage modulation m. That is, pulse width modulation is possible in the one-pulse mode.

Figure 3:
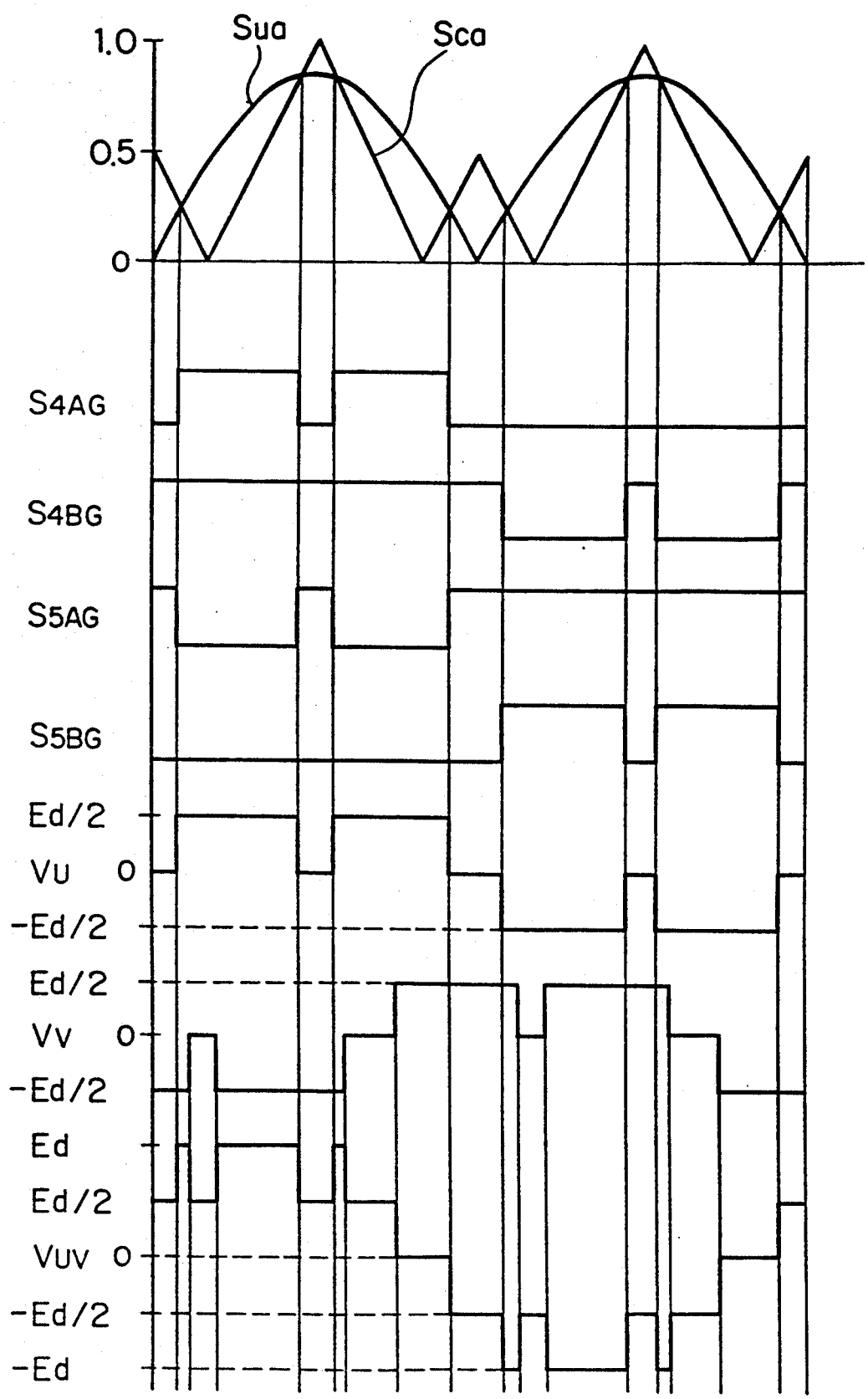

FIG. 3 is a diagram of a pulse mode corresponding to the three-pulse mode in the conventional method. In FIG. 3, $S_{ua}$ designates a sinusoidal modulating wave, and $S_{Ca}$ designates a triangular carrier wave. The gate signals $S_{4AG}$ to $S_{5BG}$ are formed by comparison between the sinusoidal modulating wave $S_{Ua}$ and the triangular carrier wave $S_{Ca}$. In the case of this three-pulse mode, the percentage modulation corresponds to the amplitude of the sinusoidal modulating wave $S_{Ua}$.

The switching elements 4A to 5B are driven by the gate signals $S_{4AG}$ to $S_{5BG}$ to obtain the phase-U output voltage $V_v$ shown in FIG. 3. Similarly, the phase-V and phase-W gate signals (not shown) $S_{5AG}$ to $S_{9BG}$ are formed to obtain the phase-V output voltage $V_v$ and the phase-W output voltage $V_w$. The difference between the phase-U output voltage $V_u$ and the phase-V output voltage $V_v$ is taken as the line U-V voltage $V_{uv}$.

Figure 4:
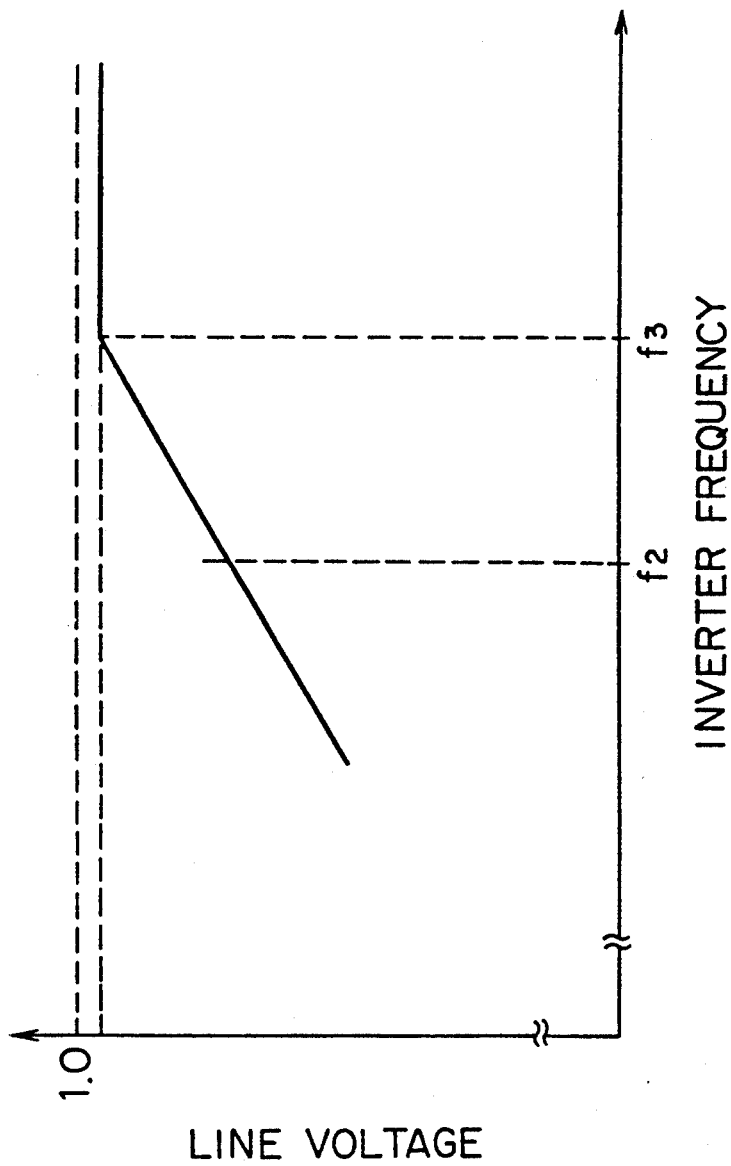
FIG. 4 is a diagram of the relationship between inverter frequencies and a line voltage of the first embodiment.

Thus, the line voltage can be controlled by pulse width modulation in each of the three-pulse mode and the one-pulse mode. It is therefore possible to avoid occurrence of a discontinuity of the line voltage, such as that occurring in the conventional inverter, at the time of transition from the three-pulse mode to the one-pulse mode at an inverter frequency $f_2$ and, hence, to continuously change the line voltage. In FIG. 4, $f_3$ designates the inverter frequency at which the line voltage corresponds to the maximum percentage modulation $m_{max}$ determined by the minimum switching element off time.

In the range of inverter frequencies equal to or higher than $f_3$, the inverter is operated by fixing the percentage modulation to the maximum percentage modulation $m_{max}$. In this operation, the proportion of the fundamental wave component of the line voltage is about 99 % of that attained by the conventional method in the one-pulse mode, if the minimum off time is about 200 μs and the maximum inverter frequency is about 200 Hz. That is, the line voltage can be controlled so as to be continuously changed without reducing the voltage utilization coefficient.

There are many types of configuration applicable to the three-phase three-level inverter other than that shown in FIG. 1. The same three-pulse and one-pulse modes as those of the above-described embodiment can be attained by using gate signals according to each applicable configuration. It is thereby possible to continuously change the line voltage with respect to the inverter frequency.

Figure 6:
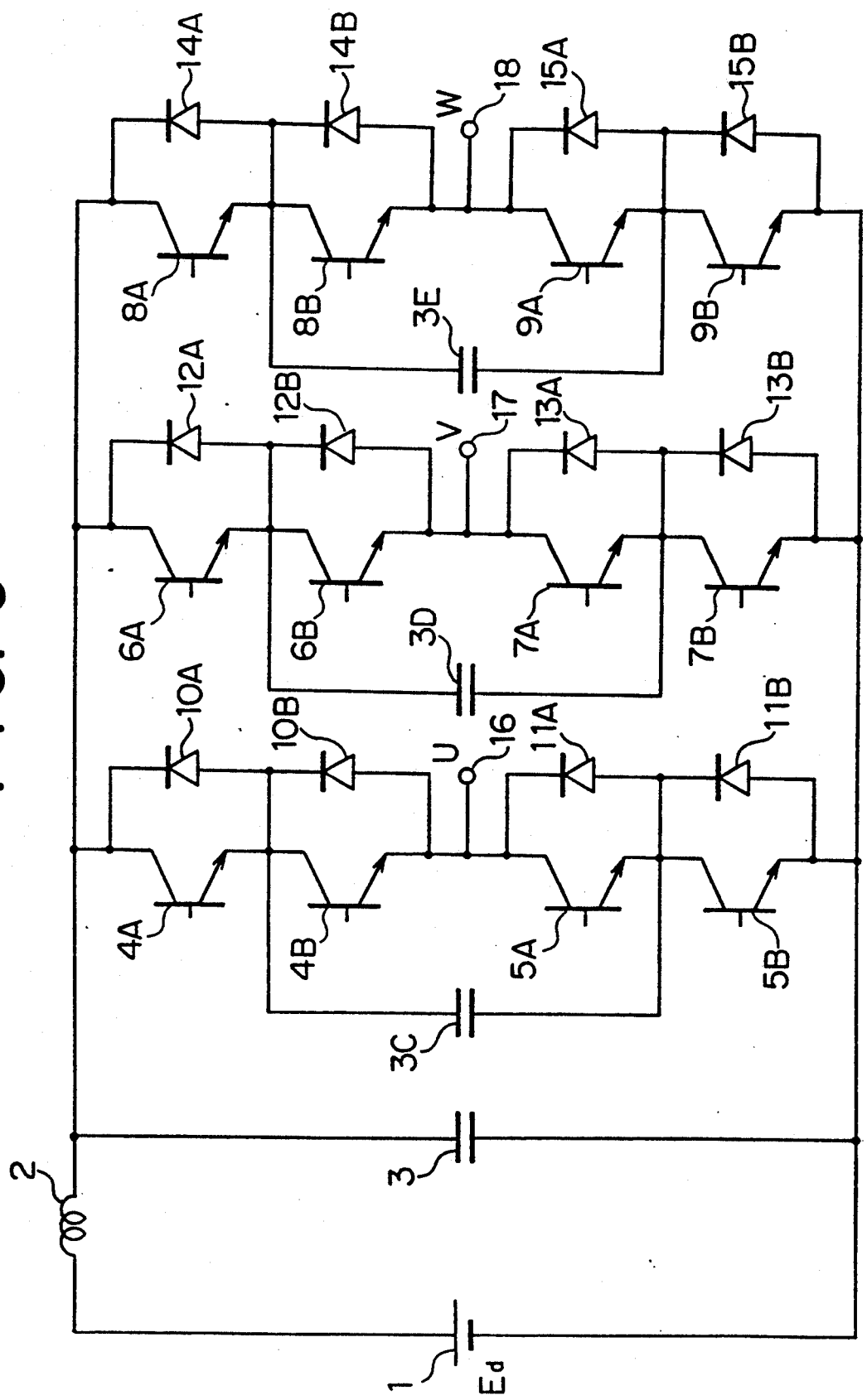
FIG. 6 is a circuit diagram of an inverter used in a second embodiment of the present invention.

FIG. 6 shows another three-phase three-level inverter having a different configuration. This inverter is constructed in such a manner that, in the inverter shown in FIG. 1, a capacitor 3 is connected between the reactor 2 and the minus terminal of the DC power source 1 instead of the capacitors 3A and 3B, a capacitor 3C is connected between the middle point of the first pair of switching elements 4A-4B and the middle point of the second pair of switching elements 5A-5B instead of the diodes 19 and 20, a capacitor 3D is connected between the middle point of the third pair of switching elements 6A-6B and the middle point of the fourth pair of switching elements 7A-7B instead of the diodes 21 and 22, and a capacitor 3E is connected between the middle point of the fifth pair of switching elements 8A-8B and the middle point of the sixth pair of switching elements 9A-9B instead of the diodes 23 and 24.

The phase-U output voltage Vu of the inverter shown in FIG. 6 has three levels $E_d/2$, 0, and $-E_d/2$ according to the on/off states of the switching elements 4A to 5B of the first and second switching element pairs, as shown in FIG. 9. Similarly, each of the phase-V output voltage $V_v$ and a phase-W output voltage $V_w$ has three levels.

Figure 7:
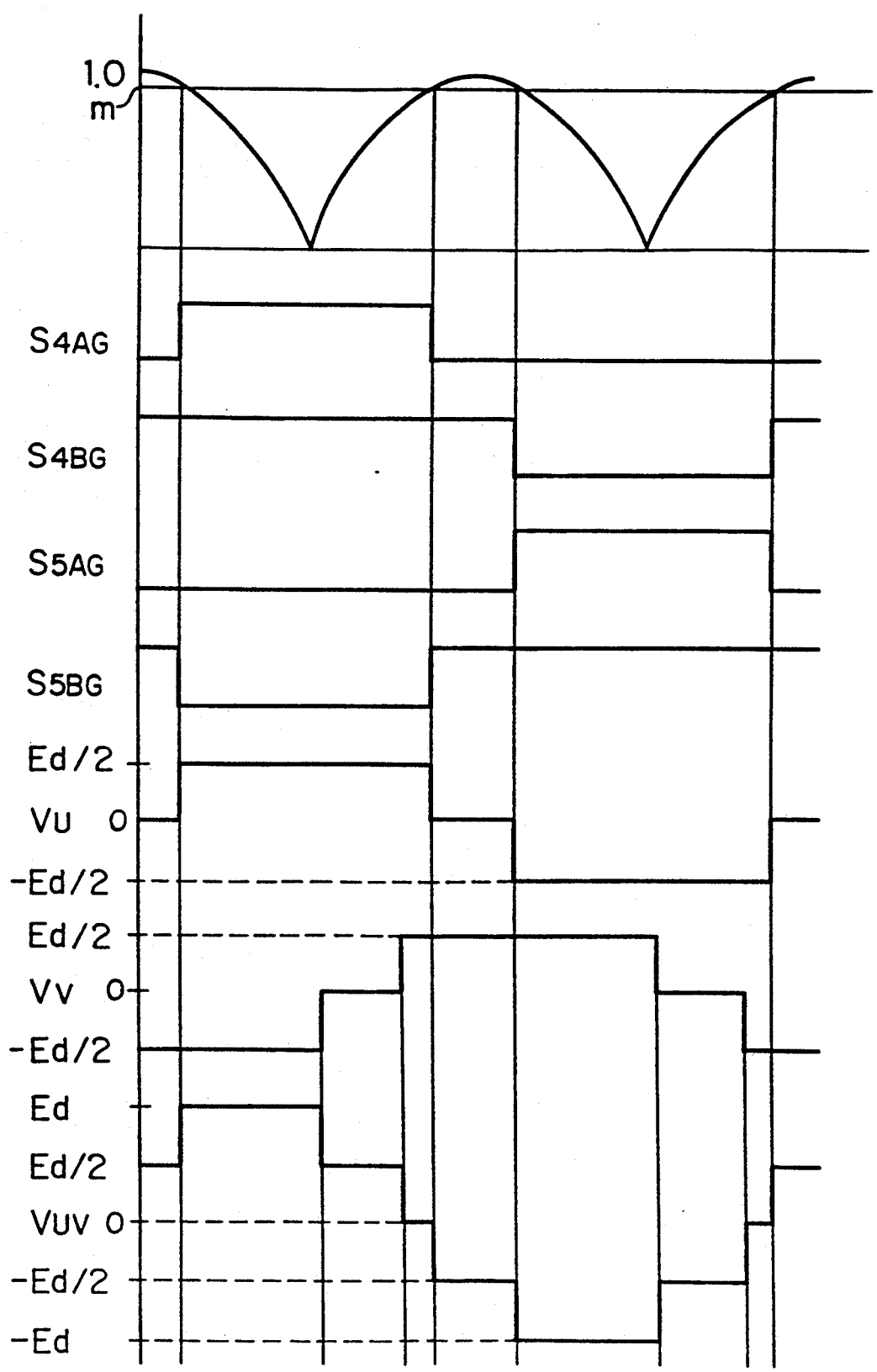
FIGS. 7 and 8 are diagrams of waveforms of the second embodiment.
Figure 8:
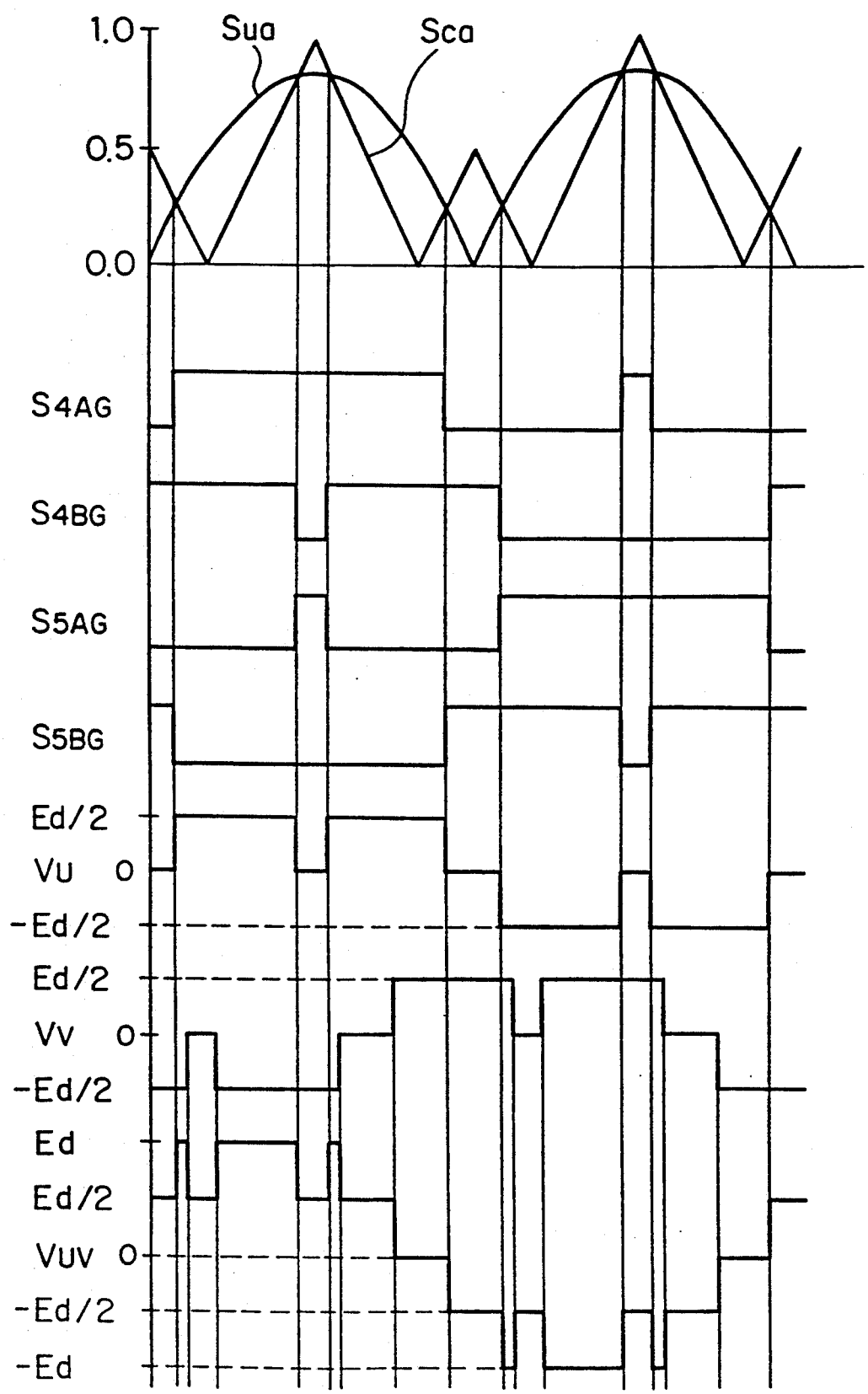
Figure 10:
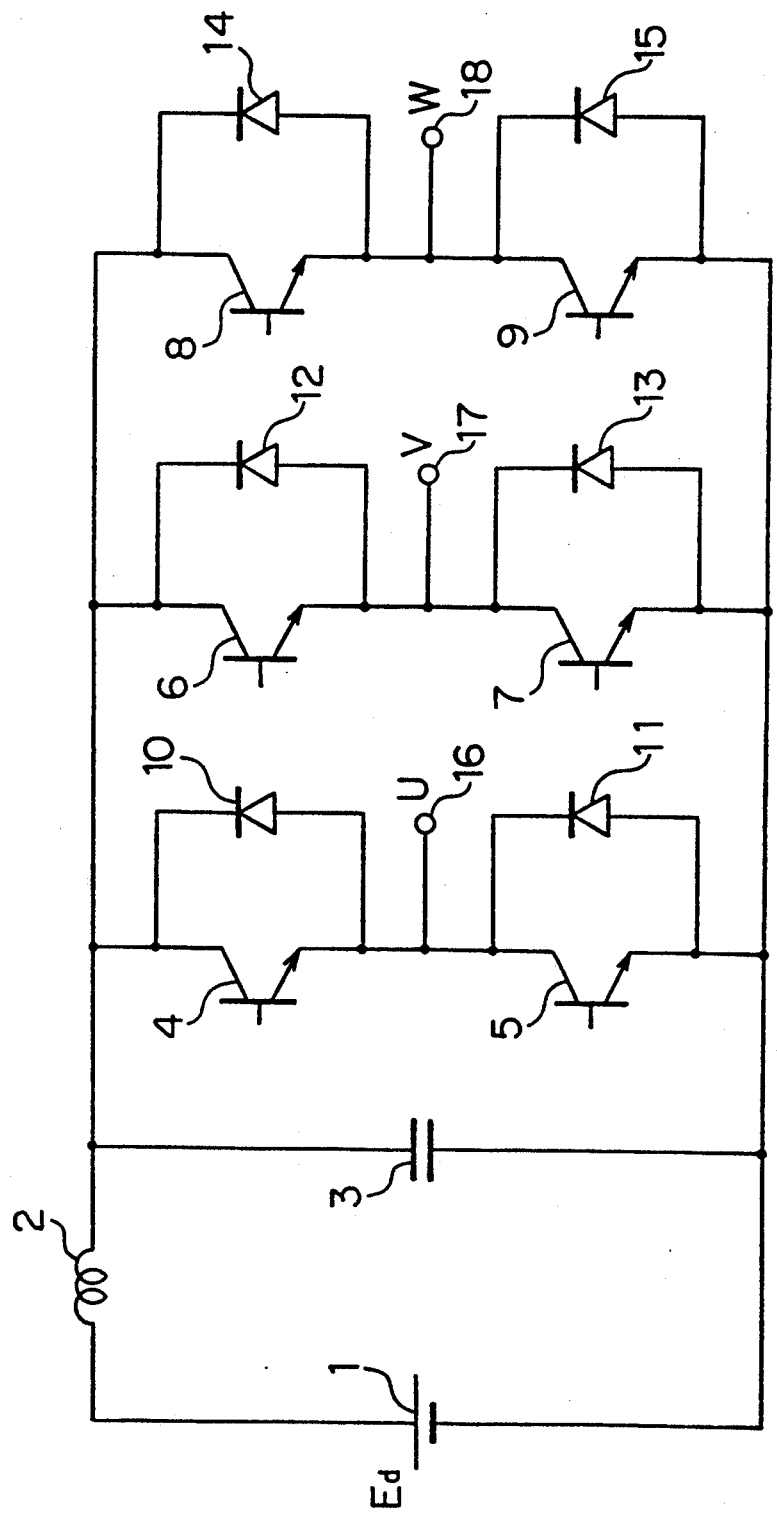
FIG. 10 is a circuit diagram of an inverter used in a conventional control method.
Figure 11:
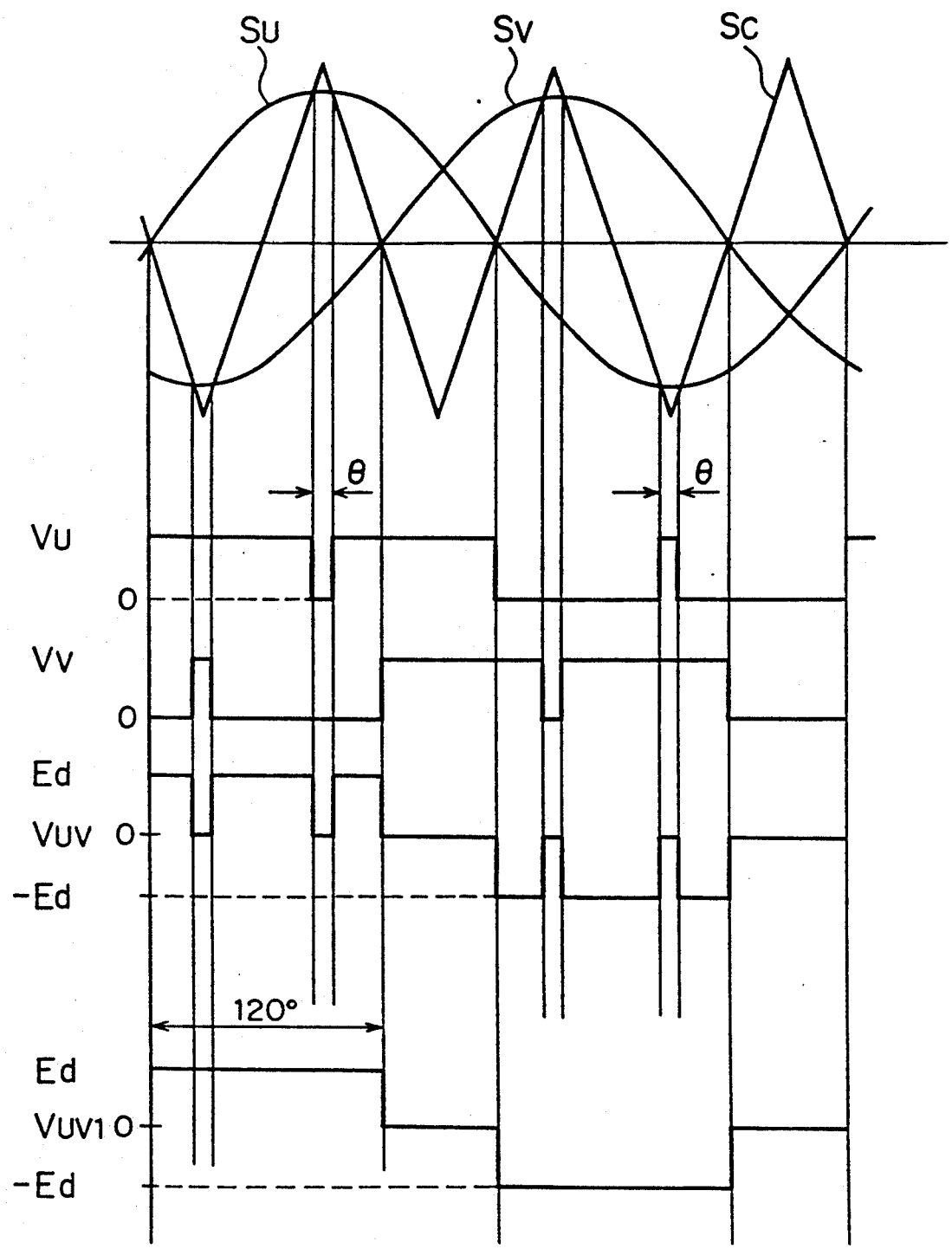
FIG. 11 is a diagram of waveforms in the conventional method.

The line voltage can therefore be controlled by pulse width modulation in each of the three-pulse mode and the one-pulse mode, as in the case of the first embodiment. FIGS. 7 and 8 respectively show the relationship between the gate signals $S_{4AG}$ to $S_{5BG}$, the phase-U output voltage $V_u$, the phase-V output voltage Vv, and the line U-V voltage $V_y$ in the one-pulse mode and the corresponding relationship in the three-pulse mode. That is, it is also possible to avoid occurrence of a discontinuity at the time of transition from the three-pulse mode to the one-pulse mode and to continuously change the line voltage as shown in FIG. 4 by using the inverter shown in FIG. 6.

In accordance with each of the above-described embodiments, a three-phase three-level inverter is used as a main circuit and the on/off control of the inverter switching elements is effected in the above-described manner, thereby enabling the line voltage to be continuously changed to the maximum value as well as preventing an abrupt change in torque ripples or undesirable oscillation of the DC filter voltage, which cannot be avoided by the conventional method. It is also possible to reduce the change in the voltage at the time of switching of each switching element to half of the corresponding change in the conventional method, i.e., to $E_d/2$ and therefore to realize an inverter unit improved in resistance to noise.

What is claimed is:

1. A method of controlling the output voltage of a three-phase three-level inverter having a plurality of switching elements by pulse width modulation, comprising the steps of:
    setting an upper limit of a percentage modulation to a value equal to or smaller than a maximum percentage modulation determined by a minimum off time of the switching elements;
    applying gate signals to the switching elements for turning the switching elements on and off; and
    outputting a three-level voltage as an inverter output voltage in each phase when each of the switching elements is turned on and off one time during an inverter output period.

2. A method of controlling the output voltage of a three-phase three-level inverter according to claim 1 further including the step of:
    controlling the inverter output voltage by pulse width modulation in a three-pulse mode and a one-pulse mode.

* * * * *